INVENTOR.
Allen E. Pollock

United States Patent Office 3,432,950
Patented Mar. 18, 1969

3,432,950
METHOD FOR TRANSPLANTING
Allen E. Pollock, 3517 Holmes,
Kansas City, Mo. 64109
Original application Feb. 3, 1965, Ser. No. 430,079, now Patent No. 3,339,299, dated Sept. 5, 1967. Divided and this application July 14, 1967, Ser. No. 653,375
U.S. Cl. 37—195   3 Claims
Int. Cl. E02f *1/00;* A01g *23/02, 23/06*

ABSTRACT OF THE DISCLOSURE

A method of transplanting wherein a trench is initially dug around a soil ball containing the roots of a plant. A support is then moved through the mass of soil at the base of the soil ball and the soil ball and plant are lifted on the support for transportation to a new location. The soil ball and the plant are tilted upon removal from the initial location to decrease the effective height of the plant.

---

This is a division of my co-pending application Ser. No. 430,079 filed Feb. 3, 1965, now Patent 3,339,299, granted Sept. 5, 1967 entitled, "Apparatus for Transplanting."

This invention relates to improvements in soil handling and, more particularly, to a method for removing a soil ball attached to the earth and transporting the same to a remote location.

It is the primary object of the present invention to provide a soil-handling apparatus and method which is capable not only of severing a soil ball attached to the earth, but also of supporting the same for movement to a remote location whereby a plant, whose root system is within tthe soil ball, may be expeditiously moved from one location to another with a minimum expenditure of time and effort.

Another object of the instant invention is the provision of apparatus and a method of the type described wherein a soil ball having a root system of a plant growing therewithin can be removed from the earth at one location and deposited in the earth at a second location in a manner such that the plant itself or its root system will not be damaged during the removal or replanting operations.

A further object of this invention is the provision of apparatus for and a method of lifting relatively large and heavy objects above ground level and transporting the same over the ground to a remote location and thereafter lowering the objects to the ground to place the same in the dispositions which they had at the original locations.

Still a further object of the present invention is the provision of apparatus and a method of the aforesaid character which permits the replanting of relatively large plants, such as young trees or the like, without damaging the plants or their root systems.

Figure 1:
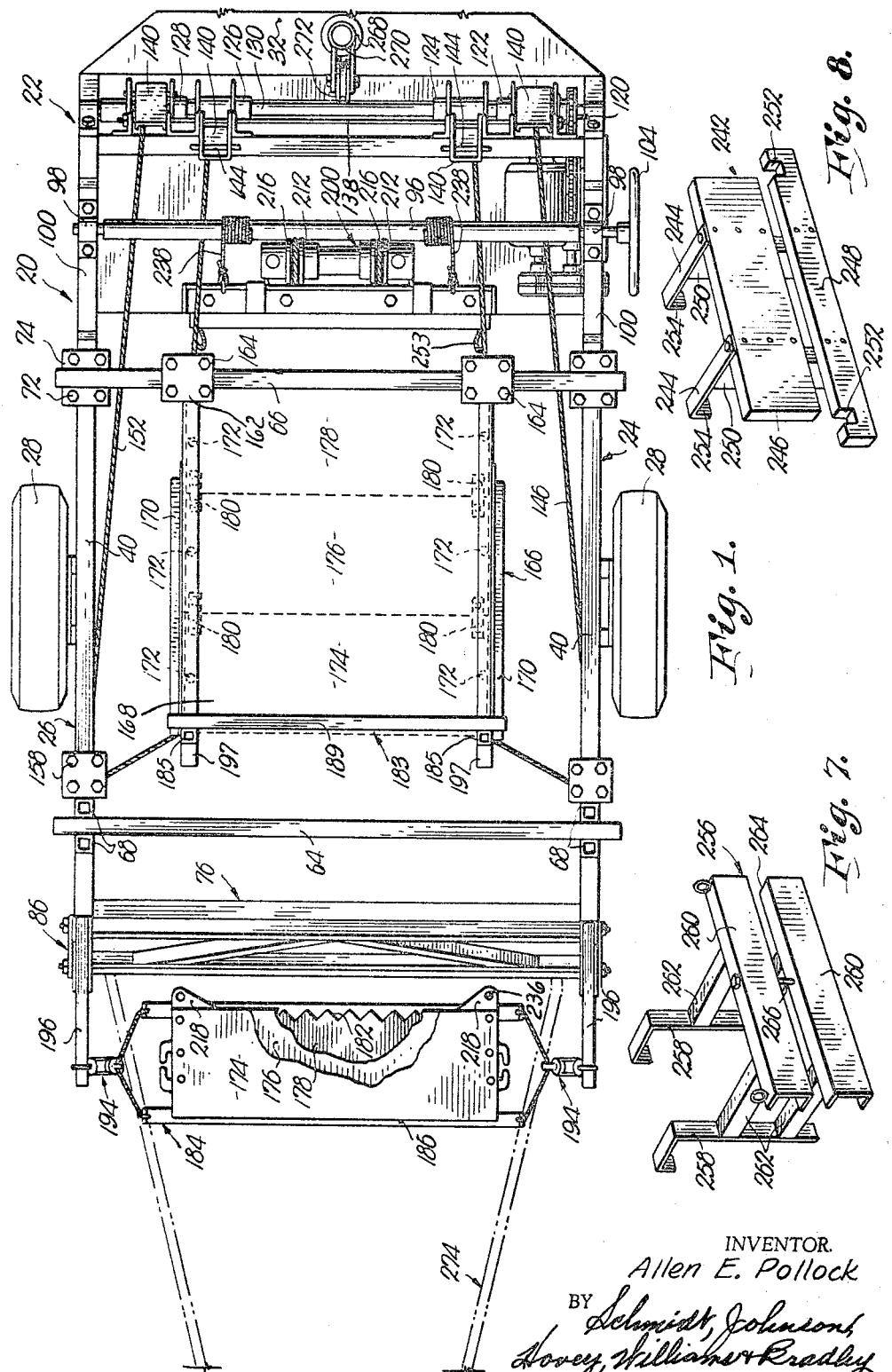
Figure 2:
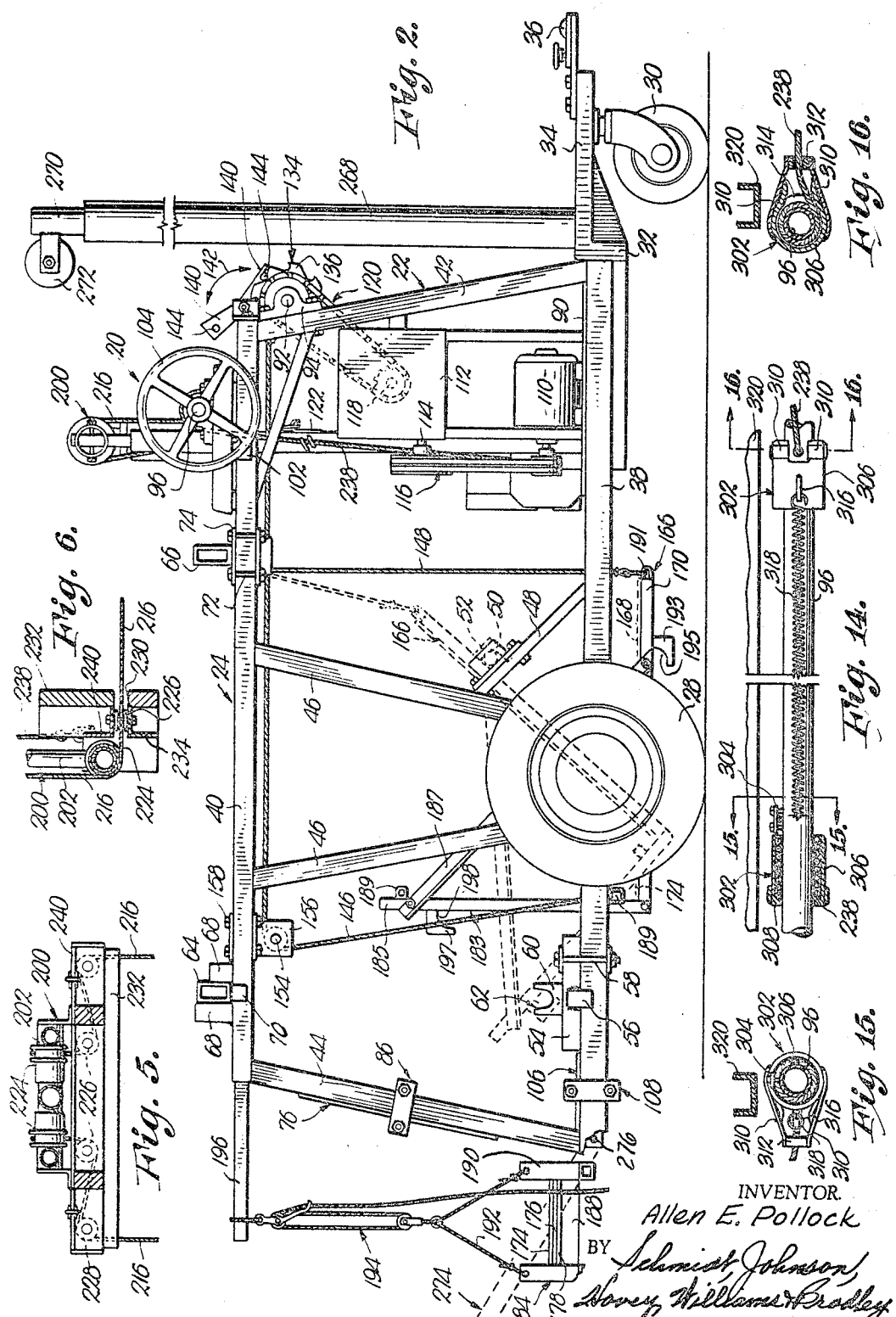
Figure 3:
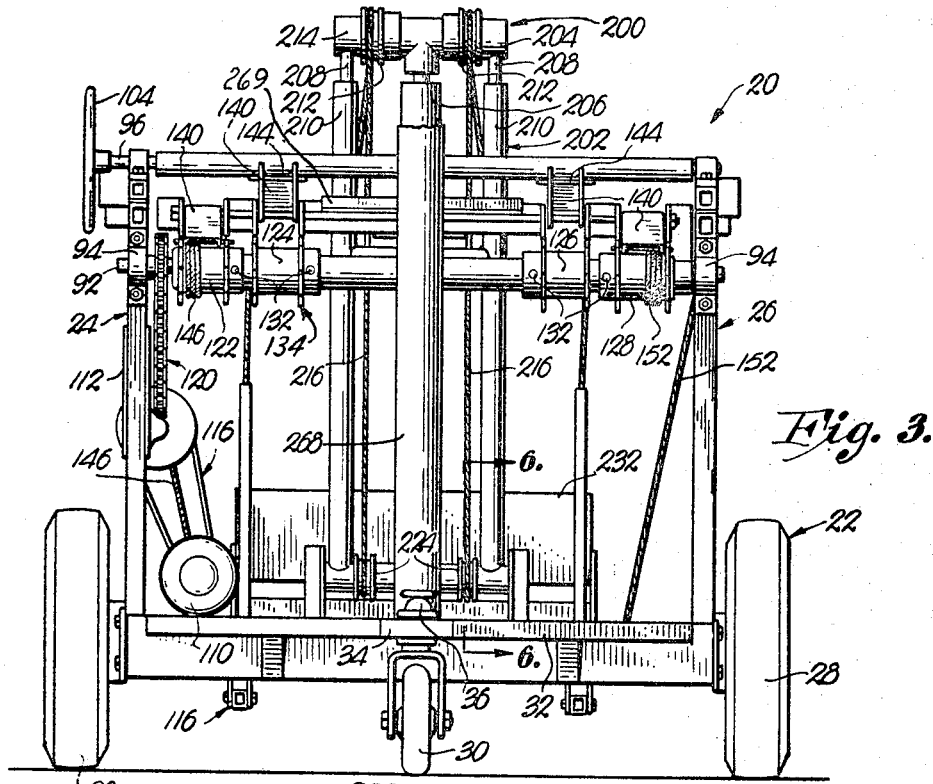
Figure 4:
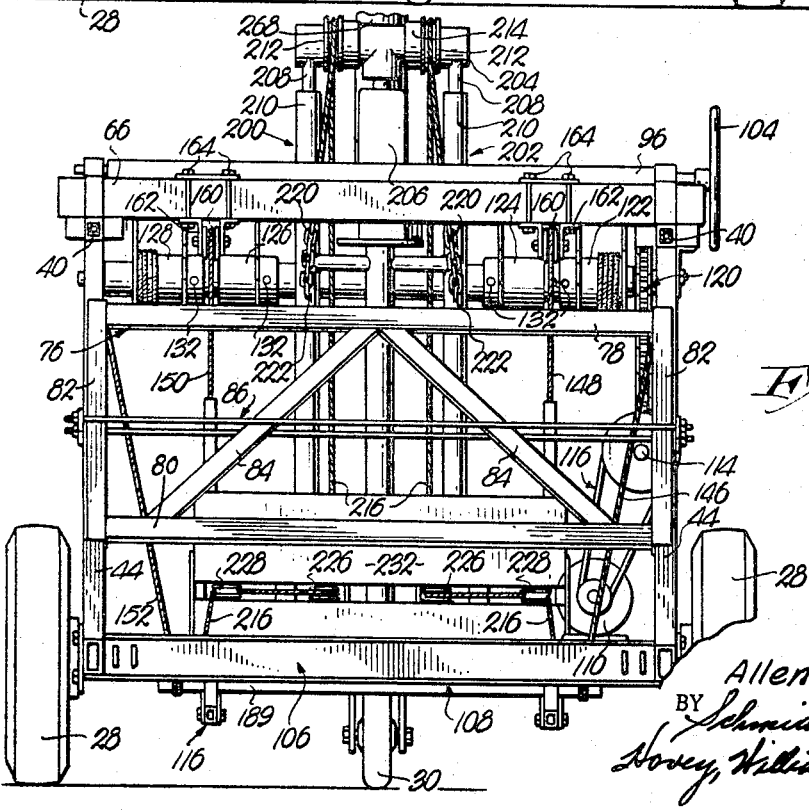
Figure 9:
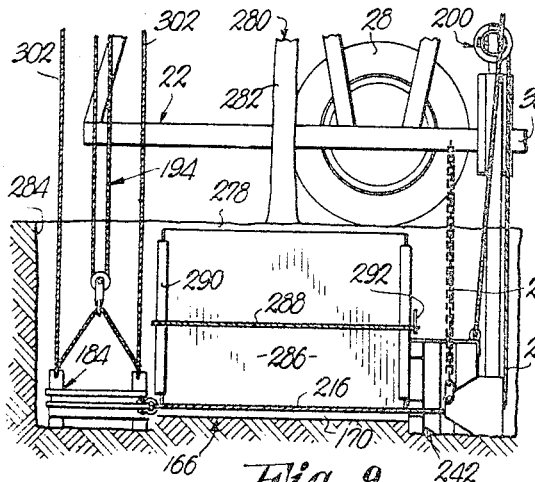
Figure 10:
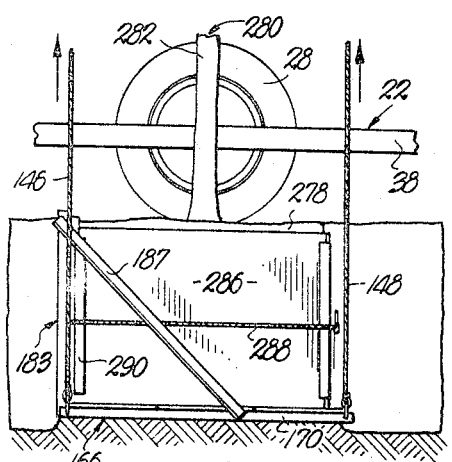
Figure 11:
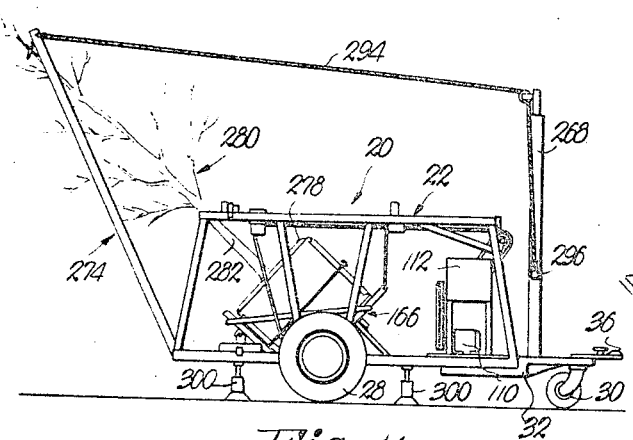
Figure 12:
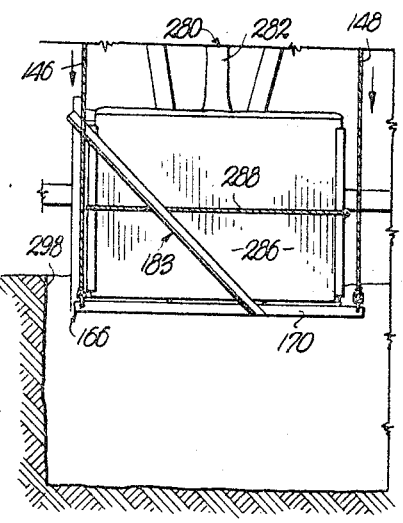
Figure 13:
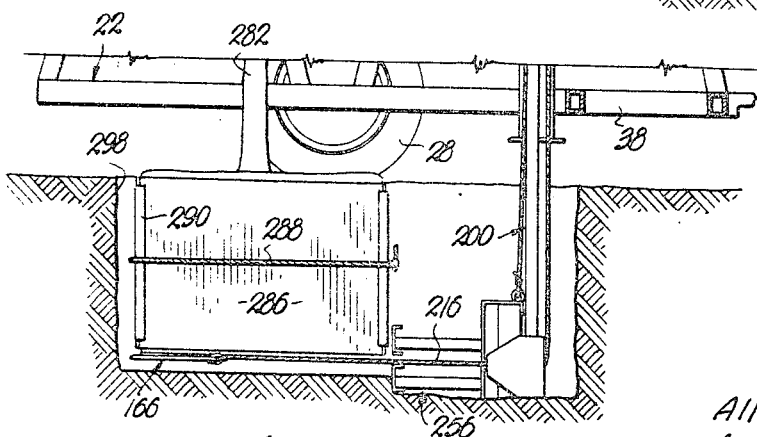

Other objects of this invention will become apparent as the following specification progresses, reference being had to the accompanying drawings, wherein:

FIGURE 1 is a top plan view of the apparatus for handling a soil ball initially attached to the earth and adapted to be removed to a remote location;
FIG. 2 is a side elevation view of the apparatus;
FIG. 3 is a front elevational view of the apparatus;
FIG. 4 is a rear elevational view thereof;
FIG. 5 is a cross-sectional view of a portion of the means for drawing a severing unit between a soil ball and the earth to sever the soil ball therefrom;
FIG. 6 is a cross-sectional view taken along line 6—6 of FIG. 3 and further illustrating the structure of FIG. 5;
FIG. 7 is an attachment for the structure of FIGS. 5 and 6 for use after the soil ball has been placed at the new location;
FIG. 8 is an attachment for the structure of FIGS. 5 and 6 for use before the soil ball is initially severed from the earth;
FIG. 9 is a view of certain components of the apparatus in operative positions adjacent to a soil ball prior to the severing of the latter from the earth;
FIG. 10 is a view similar to FIG. 9 but illustrating other components of the apparatus after the soil ball has been severed from the earth and prior to elevating the soil ball for transportation over the ground;
FIG. 11 is a side elevational view of the apparatus with the soil ball carried thereby in a tilted condition for movement over the ground and illustrating the disposition of a plant projecting outwardly from the soil ball;
FIG. 12 is a side elevational view similar to FIG. 10 but illustrating the way in which the soil ball is lowered into the earth at the new location;
FIG. 13 is a view similar to FIG. 9 illustrating the disposition of the soil ball with respect to the apparatus after the soil ball has been lowered into the earth and before the components have been separated from the soil ball.
FIG. 14 is an enlarged, fragmentary, side elevational view of a shaft forming a part of the apparatus and illustrating improved structure for maintaining a cable in a coiled condition on the shaft when tension is removed from the cable;
FIG. 15 is a cross-sectional view taken along line 15—15 of FIG. 14; and
FIG. 16 is a cross-sectional view taken along line 16—16 of FIG. 14.

The present invention provides apparatus for and a method of handling relatively large and heavy objects for movement over the ground, such as a soil ball having a plant growing outwardly therefrom. In a preferred form, the invention is adapted for removing a soil ball attached to the earth and transporting the same to a new location at which it is deposited on or within the earth so as to subsequently become permanently attached thereto once again.

The apparatus of the instant invention incudes a mobile vehicle having an open end and a pair of side portions so that the same may be disposed at ground level in straddling relationship to a plant growing upwardly from a soil ball to be removed from the earth and transported to a new location. Means is provided on the vehicle to lower a support into a trench initially dug about the soil ball. Means is further provided to move the support into a position between the earth and the soil ball whereby the soil ball is severed from the earth and rests on the support.

The mechanism carried by the vehicle is then coupled with the support for elevating the latter and thereby the soil ball resting thereon, to a position above ground level whereby the vehicle may then transport the soil ball to the new location. If a plant projects normally upwardly from the soil ball, the support may be tilted while the soil ball is retained thereon so that the effective height of the plant is decreased to permit the clearance of overhead obstructions as the plant is transported over the ground by the vehicle.

After the soil ball has been moved to the new location, the same is lowered into a hole or other excavation previously dug in the earth so as to be oriented in the desired disposition, whereupon the apparatus for lowering the same is removed therefrom and the vehicle moved away from a new location. A trench or other excavation around the soil ball may then be covered in the usual manner.

Another aspect of the instant invention is the provision of a cable coiling and holding device capable of coiling and maintaining a cable in a coiled condition on a rotatable shaft to which one end of the cable is secured. The device includes a cylinder adapted to be telescoped over the shaft and to be freely movable longitudinally thereof and rotatable about the same. A spring biases the cylinder in a direction toward the location at which the end of the cable is secured to the shaft. An arm projects laterally from the cylinder and has an eyelet adjacent the outer end thereof, the eyelet being aligned with a circumferential slot in the cylinder.

The cable to be coiled passes through the eyelet, through the slot, and then about the shaft. A ring on the cylinder adjacent to the slot has substantially the same diameter as the shaft but permits the cylinder to move longitudinally of the shaft. The ring retains the cable within the cylinder in a coiled condition, regardless of whether or not the cable is under tension. A stop in the path of travel of the arm limits the arc through which the latter may rotate. Thus, the cylinder is prevented from any substantial rotation on the shaft when the cable is received within or moves out of the cylinder.

Soil-handling apparatus 20 includes a vehicle 22 having a pair of opposed sides 24 and 26, a ground-engaging wheel 28 rotatably mounted on each of the sides 24 and 26 respectively, and a caster wheel 30 secured to the underside of a mounting plate 32 rigid to vehicle 22 adjacent the front end thereof as illustrated in FIG. 2. The forwardmost portion 34 of plate 32 provides a tongue for vehicle 22 on which a conventional hitch 36 is disposed. Thus, vehicle 22 may be towed over the ground by a towing vehicle in the usual manner. When vehicle 22 is disconnected from the towing vehicle, caster wheel 30 supports the front end of apparatus 20 and permits manual changes in the disposition thereof.

Each of the sides 24 and 26 includes a pair of vertically spaced, normally horizontally disposed beams 38 and 40 substantially spanning the distance between the front and rear ends of vehicle 22 as illustrated in FIG. 2. A front end brace 42 and a rear end brace 44 are secured to and span the distance between beams 38 and 40 to rigidly intercouple the same. A pair of intermediate braces 46 also are secured to and span the distance between beams 38 and 40 to provide structural rigidity therefor. An angularly disposed brace 48 is secured at the ends thereof to the forwardmost brace 46 and to beam 38 as shown in FIG. 2. A bracket 50, having an aperture 52 therethrough, is carried on the forwardmost face of brace 48 for a purpose hereinafter described. Similarly, an elongated member 56 on opposed sides thereof, is secured by bolt means 58 to beam 38 between brace 44 and the rearmost brace 46 as shown in FIG. 2. A bracket 60, having a recess 62 therein, is secured to the upper face of member 54. Apertures 52 and recesses 62 corresponding to sides 24 and 26 are aligned with each other and receive crossbars which are utilized as supporting surfaces for a soil ball support to be described.

A pair of crossbeams 64 and 66 are releasably coupled with beams 40 of sides 24 and 26 to provide structural rigidity for vehicle 22. Beam 64 is disposed between a pair of upright elements 68 rigid to the upper surface of each beam 40 respectively, beam 64 having ears 70 which engage the outer side surfaces of beams 40 to prevent lateral movement of crossbeam 64 relative to beams 40.

Beam 66 is secured by bolt means 72 to beams 40, it being clear that crossbeam 66 is rigid to plates 74 to which bolt means 72 is coupled. A tail gate 76, having crosspieces 78 and 80, end pieces 82, and angularly disposed braces 84, span the distance between rear end braces 44 in the manner shown in FIG. 4. Bolt means 86 releasably couples tail gate 76 to braces 44.

A platform 90 spans the distance between beams 38 at the forwardmost ends thereof as shown in FIG. 2.

A first shaft 92 spans the distance between front end braces 42 adjacent the upper ends of the latter, shaft 92 being journaled in bearings 94 rigid to braces 42 for rotation about an axis substantially transverse to the direction of movement of vehicle 22. A second shaft 96, parallel to shaft 92 and disposed rearwardly thereof, spans the distance between beams 40 and is journaled for rotation with respect thereto by bearings 98 rigidly secured to mounting bars 100 coupled with the upper surfaces of beams 40. Each bar 100 is provided with a pair of opposed ears 102, only one of which is shown in FIG. 2, which permit the corresponding bar 100 to slide along the respective beam 40. Thus, shaft 96 is movable fore and aft of vehicle 22 into any one of a number of operative positions. A handwheel 104 is secured to one end of shaft 96 for rotating the same in opposed directions.

To further rigidify vehicle 22, cross bracing, denoted by the numeral 106, spans the distance between beams 38 adjacent the rear ends thereof as shown in FIGS. 2 and 4. Bolt means 108 is employed to releasably secure bracing 106 to beams 38.

It is evident from the foregoing that, by removing crossbeam 64 tail gate 76 and bracing 106, vehicle 22 is completely open between sides 24 and 26 at least to a zone extending between beam 66 and the rearmost extremity of platform 90. Thus, the major portion of vehicle 22 may be disposed in straddling relationship to a projection extending upwardly from ground level and positioned between sides 24 and 26 rearwardly of the aforesaid zone. For movement over the ground however, crossbeam 64, tail gate 76 and bracing 106 are preferably secured in their operative positions to rigidify vehicle 22.

To rotate shaft 92, a suitable power source, such as a reversible electric motor 110, and a speed reducing gearbox 112 is provided. Motor 110 is mounted on platform 90 and is interconnected with the input shaft 114 of gearbox 112 by belt and pulley means 116. The output shaft 118 of gearbox 112 is coupled by chain and sprocket means 120 to shaft 92 in the manner illustrated in FIGS. 1–4. Motor 110 is adapted to be operably coupled with a suitable source of electrical power such as a storage battery or the like.

Shaft 92 is provided with a pair of pulleys 122 and 124 adjacent one end thereof and another pair of pulleys 126 and 128 adjacent the opposite end thereof. Shaft 92 has an enlarged, central portion 130 on which pulleys 122, 124, 126 and 128 are rotatably mounted. A setscrew 132 on each of the aforesaid pulleys releasably secures the same to central portion 130 for rotation with the latter.

Each of the last-mentioned pulleys is provided with a pair of spaced ratchet wheels 134 having teeth 136 configured in the manner illustrated in FIG. 2. A shaft 138 spanning the distance between front end braces 42 rotatably carried a transversely C-shaped bracket 140 for each of the pulleys 122, 124, 126 and 128 respectively. Brackets 140 are aligned with respective pulleys and are swingable toward and away from the latter through an arc denoted by the arcuate line 142 illustrated in FIG. 2. Each bracket 140 is provided with a cross pin 144 which spans the distance between corresponding ratchet wheels 134 and is received within the aligned spaces between adjacent teeth 136 on wheels 134 when the corresponding bracket 140 is swung forwardly and downwardly toward the respective pulley.

When pins 144 are within the spaces between adjacent teeth 136 of corresponding pulleys, the pulleys are prevented from counterclockwise rotation when viewing FIG. 2. As illustrated in FIGS. 1–3, pins 144 corresponding to pulleys 122 and 128 are in their forwardmost positions preventing counterclockwise rotation of these pulleys when viewing FIG. 2. Pins 144, corresponding to pulleys 124 and 128 are spaced from the pulleys to thereby permit rotation of the pulleys in a counterclockwise direction when viewing FIG. 2. It is noted that when pins 144 prevent this rotation of corresponding pulleys, these pulleys are uncoupled from central portion 130 of shaft 92 so that the latter may be employed to rotate the other pulleys whose pins 144 are spaced therefrom. To uncouple any one of the pulleys from portion 130, the corresponding setscrew 132 is manipulated until its pulley is free to rotate with respect to shaft 92.

A cable is provided for each of the pulleys 122, 124, 126 and 128 respectively, these cables being denoted by the numerals 146, 148, 150 and 152. All of the aforesaid cables are secured to and partially wound about their respective pulleys and extend rearwardly therefrom in the manner illustrated in FIGS. 1 and 2. Cables 146 and 152 extend rearwardly to sheaves 154, only one of which is shown in FIG. 2. Each sheave 154 is journaled on a bracket 156 for rotation about a generally horizontal axis parallel to the axis of shaft 92. Brackets 156 are releasably secured by bolts 158 to respective beams whereby the operative positions of sheaves 154 may be varied as desired.

Cables 148 and 150 extend rearwardly to sheaves 160 journaled on brackets 162 releasably secured by bolts 164 to crossbeam 66 as illustrated in FIG. 4. As shown in FIG. 1, brackets 162 are spaced inwardly from beams 40 and are substantially aligned rearwardly with pulleys 124 and 126 respectively.

Cables 146, 148, 150 and 152 extend downwardly from respective sheaves 154 and 160 and are secured at the lower-most ends thereof to four extremities of a support broadly denoted by the numeral 166.

The aforesaid cables, upon rotation of their respective pulleys under the influence of shaft 92, are utilized for raising and lowering support 166. Moreover, the front extremities of support 166 may be elevated, while the rear extremities thereof remain stationary. Conversely, the rear extremities of support 166 may be elevated, while the front extremities thereof remain stationary. This is accomplished, of course, by holding certain of the pulleys 122, 124, 126 and 128 against rotation by their respective pins 144 while the remaining pulleys are rotated by shaft 92. For instance, if it is desired to elevate the front extremities of support 166 with respect to the rear extremities thereof, the setscrew 132 of each of the pulleys 122 and 128 is manipulated so that the corresponding pulley will be rotatable on central portion 130.

Motor 110 is then energized to cause rotation of shaft 92 in a clockwise sense, when viewing FIG. 2. This action will cause rotation of pulleys 124 and 126 and thus effect further winding of cables 148 and 150 about the last-mentioned pulleys. The front extremities of support 166 will be elevated with respect to the rear extremities thereof, support 166 thus assuming the dashed-line position of FIG. 2 for this situation. To return support 166 to the full-line position of FIG. 2, motor 110 is reversed while pulleys 122 and 128 are rotatable on central portion 130 and while pulleys 122 and 128 are rotatable on central portion 130 and while pulleys 124 and 126 are rotatable therewith. It is to be noted that the weight of support 166 will maintain cables 146 and 152 substantially taut as the front extremities of support 166 are raised and lowered, it being understood that counter-clockwise rotation of pulleys 122 and 128, when the same are rotatable on central portion 130, is prevented by the action of corresponding pins 144.

Support 166 includes a plate-like platform 168 carried by a pair of spaced rails 170, platform 168 being in spanning relationship to rails 170. Bolt means 172 releasably secures platform 168 with rails 170, platform 168 being shown in dashed-lines in FIGS. 1 and 2.

Platform 168 is comprised of three plates 174, 176 and 178. To augment the holding action of bolt means 172, plates 174, 176 and 178 are releasably interconnected by strap means 180 shown in dashed-lines in FIG. 1. The normally forwardmost edge 182 of plate 178 is serrated in the manner shown in FIG. 1 so as to provide means for serving a soil ball from attachment with the earth.

Support 166 further includes bracing 183 releasably secured to rails 170 and extending upwardly therefrom. Bracing 183 is comprised of a pair of parallel upright sections 185 releasably secured at their lower ends to the rearmost ends of respective rails 170, an angularly disposed brace 187 for each section 185 respectively, for coupling the latter with the corresponding rail 170 adjacent the forward end of the latter, and a pair of parallel, vertically spaced cross braces 189 coupled to and spanning the distance between upright sections 185.

For purposes of illustration, rails 170 are provided with eyelets 191 at their forwardmost ends, only one of which is shown in FIG. 2 for receiving the lower ends of cables 148 and 150 respectively. The lower ends of cables 146 and 152 are coupled to the outer ends of the lowermost cross brace 189 in any suitable manner. It is understood, however, that the aforesaid cables may be connected to other extremities of support 166 if desired.

Each rail 170 is provided with a projection 193 extending downwardly therefrom when the rail is in the full-line position of FIG. 2. Projection 193 defines with the corresponding rail 170, a recess 195, recesses 195 of projections 193 being transversely aligned and movable into alignment with the apertures 52 of bracket 50 when support 166 is moved into the dashed-line position of FIG. 2. In this position, a bar may be moved into apertures 52 and recesses 195 and disposed below support 166 so that rails 170 may rest thereon while being retained in the dashed-line position of FIG. 2.

To support bracing 183 in the same manner when the latter is in the dashed line position of FIG. 2, projections 197 are secured to sections 185 and define with the latter recesses 198 which are alignable with recesses 62 of brackets 60 as bracing 183 moves into the dashed-line position of FIG. 2. Similarly, a bar may be disposed within the aligned recesses 62 and 198 so that bracing 183 may rest on the bar in the same manner in which rails 170 rest on the bar disposed within apertures 52 and recesses 195.

Plates 174, 176 and 178 are initially disposed prior to use thereof in a vertically stacked condition in the manner illustrated in FIGS. 1 and 2. In this condition, it is preferred that plate 174 be directly above plate 176 and the latter directly above plate 178. A carrier 184 supports plates 174, 176 and 178 when the same are vertically stacked, carrier 184 being comprised by a pair of parallel rails 186 which are interconnected by a pair of cross members 188, only one of which is shown in FIG. 2.

Plate 178 rests on and overlies member 188, there being a pair of uprights 190 at each end of carrier 184 for receiving the ends of a pair of cable sections 192 forming parts of a cable and winch assembly 194, there being an assembly 194 for each end of carrier 184 respectively. The upper end of each assembly 194 is releasably secured to a rearwardly extending projection 196 carried by the corresponding side of vehicle 22. Preferably, each of the beams 40 is tubular for telescopically receiving the corresponding projection 196. Thus, when carrier 184 is not in use, projections 196 retract into beams 40. Assemblies 194 permit raising and lowering of carrier 184 relative to vehicle 22.

Means for successively moving plates 178, 176 and 174, in that order, off carrier 184 and onto rails 170, comprises a pulling unit 200, preferably of the type illustrated in my previous disclosure, U.S. Letters Patent No. 3,129,521. This patent is incorporated herein by reference for a complete description of the details of construction thereof. However, to illustrate the way in which the aforesaid plates are pulled onto and off rails 170, the following description of unit 200 will be sufficient.

Unit 200 includes a first section 202 and a second section 204 reciprocably mounted on section 202 for vertical movement with respect thereto, under the influence of a prime mover such as a hydraulic jack 206 or the like.

Section 204 includes a pair of legs 208 which are telescopically received within tubes 210 forming parts of section 202. A pair of sheaves 212, carried by a crosspiece 214 connected to the upper ends of legs 208, are disposed to receive a pair of cables 216 which are coupled at proximal ends thereof to ears 218 on plate 178 for pulling the latter toward unit 200. The opposite end of each cable 216 is connected to a short chain (FIG. 4) which, in turn, is coupled to a hook 222 rigid to a corresponding tube 210.

Each cable 216 extends upwardly from its chain 220, is disposed about the corresponding sheave 212, and extends downwardly and about a sheave 224 aligned with the corresponding sheave 212 and forming a part of section 202. As shown in FIG. 5, each cable 216 then passes about a pair of horizontally spaced, rotatable sheaves 226 and 228 forming parts of section 202, and then outwardly from unit 200 through a slot 230 in a plate 232 secured by rigid elements 234 to the lower extremity of section 202. The outer ends of cables 216 are then coupled with the eyelets 236 in ears 218.

Jack 206 is coupled to crosspiece 214 intermediate the ends thereof and, when actuated, moves the latter upwardly to thereby exert a pulling force on the portions of cables 216 extending downwardly and about sheaves 224. This pulling force causes movement of plate 178 toward unit 200.

To minimize the stroke required of jack 206, a cable take-up device could be employed with unit 200, in which case the ends of cables 216 coupled to hooks 222 would be wound about a drum or the like rotatably mounted on section 202 of unit 200 so that, at the end of the stroke of jack 206, the jack could be retracted and the excess cable portions then be manually wound about the drum. Means would, of course, be provided on the drum to prevent retrograde rotation thereof so as to assure a pulling force on cables 216 upon actuation of jack 206.

Unit 200 is coupled by means of a pair of cables 238 to shaft 96 in the manner shown in FIGS. 1 and 2. The lower ends of cables 238 are coupled to channel member 240 which cooperates with elements 234 to interconnect plate 232 to section 202 of unit 200. Cables 238 are normally wrapped about shaft 96 to permit lowering and raising of unit 200 with respect to vehicle 22. Unit 200 normally is supported on platform 90 and is movable rearwardly thereof as shaft 96 moves rearwardly under the influence of the rearward sliding movement of bars 100 along beams 40. Unit 200, upon movement off the rear extremity of platform 90, is then free to move downwardly under the influence of the rotation of shaft 96 in a counterclockwise sense when viewing FIG. 2.

When unit 200 is to be used to pull plates 174, 176 and 178 through the base of a soil ball to sever the latter from the earth, an attachment of the type illustrated in FIG. 8 and denoted by the numeral 242, is utilized with unit 200 to abut one side of the soil ball. Generally, a trench is dug around the soil ball and unit 200 is disposed in the trench. A pair of chains 243, one of which is shown in FIG. 9, interconnects a pair of lower extremities of unit 200 with corresponding beams 38. Thus, unit 200 will be suspended by beams 38 when the same is in an operative position.

Attachment 242 includes a pair of L-shaped connectors 244 secured to an upper plate 246 which, in turn, is connected to a lower bar 248 by elements 250. Bar 248 is provided with notches 252 which receive and support respective ends of rails 170. The opposite ends of rails 170 are supported by carrier 184 so that rails 170 are effectively suspended below ground level when a soil ball is being severed. Hence, the function of rails 170 is independent of the depth of the trench required to be dug around the soil ball. Cables 216 have relatively large rings 253, FIG. 1, on their outer ends, to effectively pull plate 178 into relatively close proximity to bar 248. Connectors 244 are adapted to overlie plate 232, the latter being disposed between the downwardly extending portions 254 of connectors 244 and elements 250 so that there will be no relative movement between plate 232 and attachment 242 during use of the latter.

When unit 200 is to be used to remove plates 174, 176 and 178 from beneath a soil ball or other object, an attachment 256, shown in FIG. 7, is utilized. Attachment 256 comprises an abutment member including a pair of J-shaped connectors 258 which fit over plate 232 to couple the latter with a pair of spaced channel members 260 which are carried by spacer bars 262 on connectors 258. The space 264 between channel members 260 receives plates 174, 176 and 178, it being clear that the lowermost spacer bars 262 are normally spaced below the upper edge of the lower channel member 260 so that plates 178, 176 and 174 can be disposed in vertically stacked relationship between spacer bars 262. A pin 266 removably blocks the central portion of space 264 to releasably maintain the plates between spacer bars 262.

A tubular mast 268 is secured to and extends upwardly from plate 32 forwardly of shaft 92 as shown in FIGS. 1–3. Suitable bracing 269 is employed to rigidly couple the upper portion of mast 268 with vehicle 22. Mast 268 telescopically receives an elongated member 270 having a sheave 272 rotatably mounted on the upper end thereof. A cable is adapted to be coupled to a rearwardly extending A-frame 274 and to extend forwardly therefrom and about sheave 272. The forwardmost end of the cable is releasably anchored to mast 268 so that the disposition of A-frame 274 may be changed by manipulating the cable. A-frame 274 is releasably secured by pins 276 to the rear ends of beams 38 for pivotal movement about a generally horizontal axis transverse to the path of travel of vehicle 22. The last-mentioned cable is preferably secured to the outermost extremity of A-frame 274 so as to more effectively control the movement thereof.

*Operation*

Apparatus 20 may be used for lifting and transporting a relatively large and heavy object over the ground, but it is especially adapted for severing a soil ball attached to the ground, lifting the soil ball out of the ground, moving the same to a new location and depositing the same into the ground in a hole previously dug for the purpose of receiving the soil ball. Provision is made for a projection extending upwardly from the soil ball, such as the trunk of a small tree or the like. Thus, apparatus 20 and the method of the instant invention may be utilized for transplanting relatively large, elongated and heavy plants which otherwise would be too cumbersome to handle by conventional moving equipment. In summary, therefore, the instant method, with respect to a soil ball, includes the steps of severing the soil ball from attachment with the earth, lifting the soil ball while the same is supported from beneath, tilting the soil ball if the same contains a projection which would otherwise interfere with overhead obstructions, moving the soil ball to a new location, returning the soil ball to its initial disposition if the same has been previously tilted, lowering the soil ball into the earth at the new location, and filling the space around the soil ball so that it will once again become permanently attached to the earth. The soil ball will be covered during the aforesaid operations to maintain the same intact, as well as to prevent damage to the root system of a plant growing therefrom.

The steps of the method are illustrated in FIGS. 9–13 wherein a soil ball 278 is to be moved from one location to a new location remote therefrom. For purposes of illustration, soil ball 278 contains the root system of a small tree 280 whose trunk 282 extends upwardly from the upper extremity of soil ball 278 as illustrated in FIGS. 9, 10 and 13.

Initially, a trench 284 of any depth is dug around soil ball 278 to a depth slightly below the horizontal plane along which soil ball 278 is to be severed from the earth. The trenching operation may be conveniently performed by a conventional trenching machine if such is available. The maximum width of trench 284 should not, however, be as great as the distance between wheels 28.

Vehicle 22 is moved into close proximity with soil ball 278 and crossbeam 64, tail gate 76, and cross bracing 106 are removed therefrom so that the rear end thereof will be open, permitting vehicle 22 to straddle trench 284 with sides 24 and 26 on opposed sides of soil ball 278. It is to be noted that support 166 is not in the space between sides 24 and 26, the outer ends of cables 146, 148, 150 and 152 being coupled in any suitable manner to respective anchoring points until the same are to be used for supporting the respective extremities of support 166. As shown in FIG. 9, vehicle 22 is disposed in straddling relationship to soil ball 278 with trunk 282 substantially between wheels 28.

Soil ball 278 is initially covered at the sides thereof by side panel 286, only one of which is shown in FIG. 9. A cable 288 is wrapped around panels 286 and engages arcuate bearing strips 290 at the junctions between adjacent panels 286. A cable fastening device 292 maintains tension on cable 288 and thereby maintains panels 286 against the soil ball.

Projections 196 are then extended rearwardly from respective beams 40 and assemblies 194 are coupled with projections 196. With plates 174, 176 and 178 stacked on carrier 184, the latter is lowered into trench 284 by manipulating assemblies 194. Unit 200 is then lowered into trench 284 on the side of soil ball 278 opposite to the side adjacent to carrier 184. This is accomplished by forcing shaft 96 rearwardly unitil unit 200 clears the rear extremity of platform 90. Handwheel 104 may then be manipulated to lower unit 200 into trench 284 until unit 200 is suspended by chains 243. The lengths of chains 243 are such as to position the portions of cables 216 extending toward carrier 184 substantially horizontally, whereby the plates on carrier 184 will be pulled along a horizontal path upon actuation of jack 206. Attachment 242 is releasably disposed on unit 200 and abuts the adjacent panel 286 to prevent relative movement between unit 200 and soil ball 278 as the plates are pulled through the base of the soil ball to sever the same from the earth. Rails 170 are then positioned in the trench with the ends of the rails being in engagement with and supported by carrier 184 and attachment 242 in the manner set forth above. Hence, regardless of the depth of the trench, rails 170 will be suspended below ground level and will guide plates 174, 176 and 178 through the soil ball.

The ends of cables 216 are coupled to plate 178 and the latter drawn into the base of soil ball 278 by the actuation of jack 206. Before plate 178 completely penetrates the soil ball, plate 176 is coupled to plate 178 by strap means 180, whereupon jack 206 is actuated once again to further move the two interconnected plates into the soil ball. Finally, plate 174 is coupled by strap means 180 to plate 176, whereupon further actuation of jack 206 will move the plates until serrated edge 182 has completely severed soil ball 278 from the earth and plates 174, 176 and 178 completely underlie the soil ball. It is to be noted that the aforesaid plates move along and on rails 170 as the same are pulled through the soil ball. After the severing operation has been completed, plates 174, 176 and 178 are attached by bolt means 172 to rails 170.

Bracing 183 is coupled to rails 170 after the last-mentioned plates are moved into the positions thereof underlying soil ball 278. The ends of cables 146, 148, 150 and 152 are then coupled to support 166 at the locations indicated above. This is illustrated in FIG. 10 wherein soil ball 278 is about to be lifted out of the ground and carrier 184 and unit 200 have been removed from trench 284 inasmuch as they are no longer needed. Carrier 184 is raised by manipulating assemblies 194 and unit 200 is raised onto platform 90 by rotating shafts 96 in a clockwise sense when viewing FIG. 2 and moving bars 100 forwardly.

Motor 110 is then actuated to rotate shaft 92 in a clockwise sense when viewing FIG. 2. This, in turn, causes support 166 to raise soil ball 278 until the same is above ground level. It is assumed, of course, that pulleys 122, 124, 126 and 128 are fixed to central portion 130 of shaft 92 for rotation therewith.

If tree 280 is of too great a height, soil ball 278 may be tilted into the position thereof illustrated in FIG. 11 prior to movement over the ground with vehicle 22. This is accomplished by lifting the front extremities of support 166 relative to the rear extremities in the manner described above. A-frame 274 is moved into the operative position thereof as shown in FIG. 11 by manipulating cable 294 which may be wound on a winch 296 coupled to mast 268. Tree 280 is preferably between the sides of A-frame 274 and the outer end of cable 294 is secured to the outer extremity of tree 280 to support the same.

Bracing 183, together with plates 174, 176 and 178 effectively support the covered soil ball 278 when the latter is in the tilted position thereof illustrated in FIG. 11. Crossbars are placed beneath rails 170 and bracing 183 in the manner described above, and motor 110 is reversed to lower support 166 until rails 170 and bracing 183 rest on the crossbars. This supporting action effectively prevents any lateral movement of the soil ball, as well as removes the tension on the cables attached to support 166.

Crossbeam 64, tail gate 76 and cross bracing 106 are then placed on vehicle 22 at the positions thereof shown in FIG. 2, thus placing vehicle 22 in condition for movement over the ground. A towing vehicle is then attached to hitch 36 in a manner such that caster wheel 30 is spaced above the ground, whereby vehicle 22 is supported solely by wheels 28 and hitch 36.

Vehicle 22 is moved to the new location and positioned so that the soil ball, in its upright disposition, will overlie a hole 298 dug in the ground to the proper depth for receiving the soil ball. This is illustrated in FIG. 12 wherein the soil ball has moved to its upright disposition and is being lowered into hole 298. After the soil ball has reached the bottom of hole 298, bracing 183 is removed from rails 170 and unit 200, with attachment 256 thereon, is lowered into hole 298 on one side of soil ball 278.

With channel members 260 of attachment 256 abutting the soil ball and a portion of the earth therebelow in the manner shown in FIG. 13, cables 216 are coupled to plate 178 for pulling all three plates of support 166 toward unit 200. Bolt means 172 are removed from rails 170 so that plates 174, 176 and 178 may slide over rails 170 toward unit 200 under the influence of cables 216. When plate 178 enters the space between spacer bars 262, it is disconnected from plate 176 and falls a short distance onto the lowermost spacer bars 262. Similarly, plate 176, upon entering the last-mentioned space and supported by plate 178, will be disconnected from plate 174 and also fall a short distance below the upper edge of the lower channel member 260. Finally, plate 174 will move into the space and onto plate 176, whereupon the plates will be vertically stacked and pin 266 may then be positioned to block space 264. Unit 200 may then be elevated to its normal position on platform 90 by rotating shaft 96 in the proper direction. Rails 170 are then removed from hole 298 and side panels 286 are removed from soil ball 278. Hole 298 is then filled with soil so that soil ball 278 will naturally become permanently attached to the earth once again.

It is to be noted that crossbeam 64, tail gate 76, and cross bracing 106 will have to be removed from vehicle 22 in order for the same to be moved away from tree 280 when the latter is at the new location. Also, A-frame 274 will have to be removed so as to permit clearance of tree 280 as vehicle 22 is shifted away therefrom.

Apparatus 20, although illustrated and described for transplanting a tree, may be used for lifting and transporting other objects as well. For instance, the same may be utilized for moving large shrubs, stones or material containers from place-to-place. With respect to plants, such as trees or shrubs, these may be handled with apparatus 20 without causing any appreciable damage to the root systems thereof during the severing, raising, transporting, or lowering operations. The instant invention is thus suitable for handling large, bulky objects which would otherwise be difficult or impossible to move with conventional moving equipment.

Apparatus 20 is suitable for handling soil balls of different sizes up to a size limit determined by the upper surface area of plates 174, 176 and 178 and the spacing between sides 24 and 26. It is contemplated that a soil ball having a substantially square, horizontal cross section of dimensions of 30″ x 30″ can be readily handled with apparatus 20; however, this configuration and these dimensions are not to be understood as limiting the instant invention in any way. At this size, the soil ball is capable of containing the major portion of the root system of a tree having a trunk diameter of approximately 5 inches.

To handle a soil ball of maximum size with a vehicle 22 of minimum size, the vehicle is normally positioned with respect to the soil ball 278 in the manner illustrated in FIG. 9 with wheels 28 slightly in advance of the center of the soil ball. This permits carrier 184 and unit 200 to be lowered into trench 284 without interference from the other components of apparatus 20. Upon removal of carrier 184 and unit 200 from trench 284 after plates 174, 176 and 178 have been moved beneath the soil ball, vehicle 22 is moved rearwardly until wheels 28 thereof are on opposed sides of the soil ball. Thus, the wheels are aligned with the center of gravity of the soil ball during lifting of the latter. Thus, the stress placed on vehicle 22 during lifting and transporting of the soil ball is minimized.

Vehicle 22 is preferably leveled prior to lifting soil ball out of trench 284 and prior to lowering the soil ball into hole 298. This may be accomplished by a pair of levelling devices 300 on each of the sides 24 and 26 respectively, as illustrated in FIG. 11. Devices 300 may be of any construction, such as hydraulic jacks or mechanical screws. By levelling vehicle 22, the soil ball will be raised vertically without swinging in pendulum fashion due to unbalance. To assure that carrier 184 is lowered to the proper depth corresponding to the depth of unit 200 determined by chains 243, a pair of fixed length cables 302 interconnect each end of carrier 184 with the corresponding projection 196 thereabove. Thus, after vehicle 22 is levelled, cables 216 will pull plates 174, 176 and 178 through a horizontal plane.

After vehicle 22 is moved to a location adjacent to hole 298, the vehicle is once again levelled so that, assuming that hole 298 is of the same depth as trench 284, cables 216 will once again pull plates 174, 176 and 178 along a horizontal plane. Therefore, by use of devices 300, chains 243 and cables 302, the plates of support 166 will at all times move through the horizontal plane defined thereby so as to substantially eliminate any errors in the positioning of unit 200 for pulling the plates under the soil ball or removing the plates from beneath the same.

In raising and lowering unit 200, cables 238 on shaft 96 often expand from their coiled condition on the shaft so that the convolutions of the cables become entangled with each other thus requiring immediate attention before shaft 96 can once again be rotated in either direction. To eliminate this problem, structure has been provided to coil the cables 238 as shaft 96 rotates in a clockwise sense when viewing FIG. 2 and for maintaining the cables 238 in their coiled conditions when tension is removed from the cables.

To this end, a pair of cable coiling and holding devices 302 are provided on shaft 96 in the manner illustrated in FIGS. 14–16. Devices 302 are substantially identical in construction and are normally spaced apart and disposed adjacent to respective cable clamps 304 which secure the corresponding cables 238 to shaft 96. Each device 302 includes a cylinder 306 telescopically received on shaft 96 and having a diameter such that the space between shaft 96 and the cylinder 306 is substantially equal to twice the diameter of the corresponding cable 238. Thus, cable 238 is capable of being coiled about shaft 96 within cylinder 306 as shown in FIG. 14. A ring 308 is integral with cylinder 306 adjacent to one end thereof and has an inner periphery which is in relatively close proximity to, but spaced slightly outwardly from the outer surface of shaft 96. Thus, cylinder 306 may move longitudinally of shaft 96 and rotate about the longitudinal axis thereof.

A pair of arms 310 project laterally from the end of cylinder 306 adjacent to ring 308. Arms 310 converge toward each other and are connected to an eyelet 312 aligned with a circumferentially extending slot 314 in cylinder 306. An ear 316 has an aperture therethrough for interconnecting a coil spring 318 and cylinder 306. The corresponding cable 238 passes through eyelet 312, through slot 314, about shaft 96 and is clamped to the latter by clamp 304, the latter being disposed adjacent to the end of cylinder 306 opposite to the end corresponding to ring 308.

A longitudinally extending stop 320 is adjacent to and spaced from shaft 96 within the path of rotational movement of arms 310. Stop 320 limits the arc through which arms 310 and, thereby their respective cylinders 306, may rotate.

In use, stop 320 is mounted in any suitable manner, preferably on bars 100 so as to be movable with shaft 96. Cylinders 306 are disposed on shaft 96 in the manner shown in FIG. 14 with cables 238 extending through eyelets 312 and slots 314. Spring 318 biases cylinders 306 toward each other.

A shaft 96 is rotated in a clockwise sense when viewing FIG. 2, cables 238 are drawn into respective cylinders 306 and coiled on shaft 96. As the number of convolutions of each cable 238 becomes great enough, the corresponding cylinder 306 may shift longitudinally of shaft 96 toward the corresponding end of the latter to thereby accommodate additional convolutions. Spring 318 however, biases the cylinder toward the center of shaft 96.

Each cable 238 is normally under tension as it is coiled on shaft 96 and the convolutions of the cable are uniformly disposed about shaft 96. When the tension is removed from the cable, the convolutions, in the absence of the corresponding device 302, would have a tendency to expand and move outwardly of shaft 96 in different directions, resulting in entanglement of the convolutions. By the use of device 302, the convolutions are prevented from moving outwardly of shaft 96 and are effectively retained within the corresponding cylinder 306. Moreover, ring 308 of each device 302 prevents longitudinal movement of the cable convolutions relative to shaft 96. The convolutions are, of course, prevented from longitudinal movement in the opposite direction by the corresponding clamp 304.

As shaft 96 is rotated in the clockwise sense when viewing FIG. 2, cylinders 306 have a tendency to rotate therewith; however, stop 320 prevents any substantial rotation of cylinders 306 by virtue of being in the path of travel of arms 310. Thus, no difficulty arises when shaft 96 is rotated.

Eyelets 312 and slots 314 effectively guide cables 238 into and out of cylinders 306. Thus, each cable 238 enters and leaves the corresponding cylinder 306 at the same location at all times.

Having thus described the invention, what is claimed as new and desired to be secured by Letters Patent is:

1. The method of handling a soil ball attached to the earth and having a tree projecting upwardly therefrom, said method comprising:
- digging a circumscribing, generally rectangular trench in the ground to define a generally rectangular soil ball;
- pulling an elongated, rigid element through the ground below the surface thereof to sever the soil ball from the earth;
- supporting the soil ball from beneath the latter and above the soil therebeneath;
- applying lifting forces at each lower corner of the soil ball from above ground level as the soil ball is supported from beneath;
- continuing to apply said lifting forces to a pair of adjacent corners of the soil ball while discontinuing the application of forces to the other corners thereof to tilt the soil ball and the tree;
- permitting the lateral movement of said other corners responsive to the continuing lifting forces applied to said pair of adjacent corners to shift said soil ball simultaneously with the tilting thereof; and
- moving the soil ball over the ground when the same is in said tilted position.

2. The method as set forth in claim 1, wherein is included the step of supporting the trunk of said tree as the soil ball is moved over the ground.

3. The method as set forth in claim 1, wherein is included the step of covering the sides of the soil after the trench has been dug and before the soil ball is severed from the earth.

References Cited

UNITED STATES PATENTS

| | | | |
|---|---|---|---|
| 640,889 | 1/1900 | Dunbar et al. | 214—3 |
| 986,390 | 3/1911 | Hill | 214—3 |
| 1,764,935 | 6/1930 | Davey et al. | 37—2 X |
| 1,879,120 | 9/1932 | Davey | 37—2 X |
| 1,976,160 | 10/1934 | Coplen | 214—3 |
| 2,977,716 | 4/1961 | Pearce | 37—2 X |
| 2,990,630 | 7/1961 | Crawford | 37—2 |
| 3,017,707 | 1/1962 | Sigler et al. | 37—2 |
| 3,129,521 | 4/1964 | Pollock | 37—2 |

FOREIGN PATENTS 14,100 4/1852 Great Britain.

EDGAR S. BURR, *Primary Examiner.*

U.S. Cl. X.R.

37—2; 214—3